United States Patent [19]

Naugle et al.

[11] 4,382,767

[45] May 10, 1983

[54] APPARATUS FOR MAKING CONTAINER FOR STORING FOOD

[75] Inventors: George H. Naugle, Central Valley; Robert L. Gordon, Monroe; Richard J. Pines, Middletown, all of N.Y.

[73] Assignee: International Paper Company, New York, N.Y.

[21] Appl. No.: 170,582

[22] Filed: Jul. 21, 1980

Related U.S. Application Data

[62] Division of Ser. No. 906,275, May 15, 1978, Pat. No. 4,225,053.

[51] Int. Cl.³ .................... B29C 17/04; B29C 27/16
[52] U.S. Cl. ................................. 425/504; 156/287; 156/444; 156/475; 264/516; 425/503; 425/387.1; 425/388
[58] Field of Search ............... 264/516, 554; 156/287, 156/444, 475; 425/503, 504, 387.1, 388

[56] References Cited

U.S. PATENT DOCUMENTS

| | | | |
|---|---|---|---|
| 3,651,185 | 3/1972 | Menkel | 264/554 X |
| 4,013,748 | 3/1977 | Valyi | 264/516 X |
| 4,155,697 | 5/1979 | Gordon et al. | 425/535 |

*Primary Examiner*—Jan H. Silbaugh
*Attorney, Agent, or Firm*—Richard M. Barnes

[57] ABSTRACT

Disclosed is a container for storing product and a process and apparatus for making the container. The container comprises a paperboard outer container and a plastic inner container which has been drawn and blow formed into the outer container. The container is characterized by plastic screw threads which extend from the plastic inner container around the upper portion of the outside of the paperboard outer container. The screw threads permit a cap to be screwed onto the container after product, e.g. food, is placed in the container. The screw threads are vacuum formed, preferably simultaneously with the blow forming of the plastic inner container.

14 Claims, 9 Drawing Figures

APPARATUS FOR MAKING CONTAINER FOR STORING FOOD

This is a division of application Ser. No. 906,275 filed May 15, 1978, now U.S. Pat. No. 4,225,053.

BACKGROUND OF THE INVENTION

Containers for storing food are well known in the art. It is well known that such containers may be produced from many different materials and combinations of materials, e.g., paperboard, glass, aluminum and certain plastics. There are, of course, advantages and disadvantages which inhere in the use of each of those different materials. For example, paperboard is a relatively strong container material but suffers from the disadvantage that it is relatively permeable to gases and, therefore, foods stored in containers constructed solely from paperboard lose their freshness at a relatively rapid rate. On the other hand, glass, aluminum and some plastic materials are relatively impermeable to gases, but to obtain sturdy containers from those materials is expensive because of the relatively high cost of those materials.

It is therefore most desirable in the food container art to provide a container which is sturdy, relatively impermeable to gases and relatively inexpensive. Containers which satisfy each of those three criteria are disclosed in co-pending U.S. application Ser. No. 745,834, filed Nov. 29, 1974 ('834 application), now U.S. Pat. No. 4,155,697 which disclosure is incorporated herein by reference.

The containers disclosed in the '834 application are characterized by horizontal flanges which extend outwardly at least about ⅛ inch from a plastic inner container and vertical flanges which extend at least about ⅛ inch from the horizontal flanges. The plastic inner container is drawn and blow formed into a paperboard outer container. After food is placed into the container disclosed in the '834 application, the container is sealed with a heat sealable cover, and preferably thereafter, an overcap is provided which engagedly fits around the container at its top.

While the containers disclosed in the '834 application are desirably used as containers for food in many instances, in other instances it would be desirable to store food in containers which have screw caps. At the same time it would be desirable that such containers retain the advantages of the containers disclosed in the '834 application, e.g. sturdiness, relative impermeability to gases and relative inexpensiveness.

The containers of the present invention satisfy the above criteria. The present invention is also directed to a process and apparatus for making such containers.

SUMMARY OF THE INVENTION

The container of the present invention comprises a paperboard outer container and a plastic inner container which has been drawn and blow formed into the outer container. The container further comprises plastic screw threads around the upper portion of the outside of the paperboard outer container which are formed from plastic which extends from the plastic inner container around the outside of the upper portion of the paperboard outer container.

Preferably, the paperboard outer containers of the present invention have a circular cross-section throughout their entire length and have a bottom. In such containers the drawn and blow formed plastic inner container, with one exception, preferably conforms in shape and abuts with the outer container. That one exception is at the inside bottom edge of the outer container defined by the vertical wall and bottom of the outer container; there the plastic inner container is spaced from the outer container in the same manner and for the same reasons as in the '834 application. However, if a light material, e.g. potato chips, or a non-perishable material is to be stored in the container, it may not be necessary to space the inner container from the outer container in the above-described manner.

After product, e.g. food, is placed in the container of the present invention, preferably, a sealable cover is applied to the upper edge of the container and a cap is screwed onto the container. In the preferred embodiment, the sealable cover is initially provided as a liner in close abutment with the inside surface of the top of cap and that cover is heat sealed to the upper edge of the container by applying heat through the cap after that cap is screwed onto the container. The cover may also be sealed to the upper edge of the container by glue.

The containers of the present invention are constructed by first positioning a paperboard outer container into a female mold. The paperboard outer container is positioned so that it extends upward beyond the upper portion of the female mold. Thereafter, a heated sheet of plastic is drawn into the female mold with a male mandrel. The male mandrel and female mold are arranged and constructed so that concurrently with drawing plastic into the interior of the paperboard outer container plastic is also drawn around the upper portion of the outside of the paperboard outer container. After the male mandrel fully engages the female mold, and preferably substantially concurrently with such engagement, the steps of blow forming the plastic inner container and vacuum forming the screw threads commence.

The plastic inner containers of the present invention are blow formed substantially as described in the '834 application, i.e. gas under pressure is provided into the interior of the mold from holes in the male mandrel in communication with a source of gas. As in the '834 application, when the paperboard outer container has a bottom, a mandrel is used which has holes arranged and constructed so that gas may be directed toward the edge or edges of the paperboard outer container defined by the bottom of that outer container and the vertical wall or walls of that outer container.

The screw threads of the present invention are vacuum formed by providing the male mandrel with screw thread forming means in communication with a vacuum source. The screw thread forming means is arranged and constructed so that when the male mandrel is fully engaged with the female mold, the screw thread forming means surrounds the plastic which is drawn around the upper portion of the outside of the paperboard outer container. With the screw thread forming means thus arranged and constructed, plastic screw threads are constructed by applying vacuum to the plastic drawn around the upper portion of the paperboard outer container thereby causing the plastic to conform in shape with the screw thread forming means.

The female mold and male mandrel of the present invention must be arranged and constructed so that both vacuum forming and blow forming may be accomplished in the manner described above. This may be facilitated by providing gasket means in the male mandrel which, when the male mandrel is fully engaged with the female mold, closely abuts the plastic which extends around the upper edge of the outer container and presses plastic onto that upper edge thereby isolating the vacuum chamber from the blow forming chamber. We have found that as a consequence of this pressing, plastic is bonded to the paperboard along the upper edge of the paperboard outer container.

The container may be removed from the female mold and male mandrel in any suitable fashion. One method is to disengage the female mold from the male mandrel and paperboard outer container and then to unscrew the container from the male mandrel. The unscrewing is facilitated by the bond between the plastic and upper edge of the paperboard outer container described above. Another method is to employ a split mold and a split mandrel which may be opened to permit the container to be removed therefrom.

The screw thread forming means of the male mandrel of the present invention is preferably in close engagement with the plastic drawn about the outside of the paperboard outer container when the male mandrel and female mold are fully engaged. Because of this close engagement it is preferred that the screw thread forming means be arranged and constructed so that a line defined by the innermost portion of the screw thread forming means and a plane through the axis of the screw thread forming means is inclined from the vertical, e.g. at an angle of about ½ to 3°, preferably about 1°. By so constructing the screw thread forming means, the engagement of the male mandrel into the female mold with a paperboard outer container positioned therein is facilitated. Additionally, because the screw-on cap does not have screws which are inclined from the vertical, by inclining the screw thread forming means as described above, a tight fit between the cap and the container is facilitated.

DESCRIPTION OF THE PREFERRED EMBODIMENTS

Figure 1:
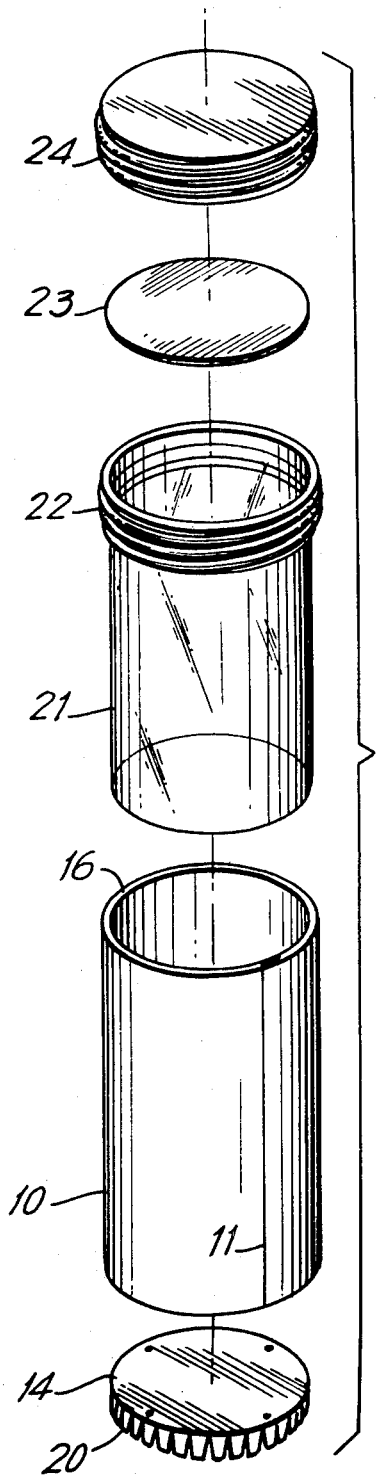
FIG. 1 shows an exploded view of a preferred container of the present invention.

Referring to FIG. 1, there is shown an exploded view of a preferred container of the present invention. The container comprises a paperboard outer container 10 which is preferably constructed from folded paperboard and has a circular cross-section throughout its vertical length. The paperboard may also be coated with plastic material, e.g. polyethylene. Additionally, as shown in FIG. 1, the paperboard outer container has a vertical side seam 11 extending along the entire length of the paperboard outer container.

Figure 2:
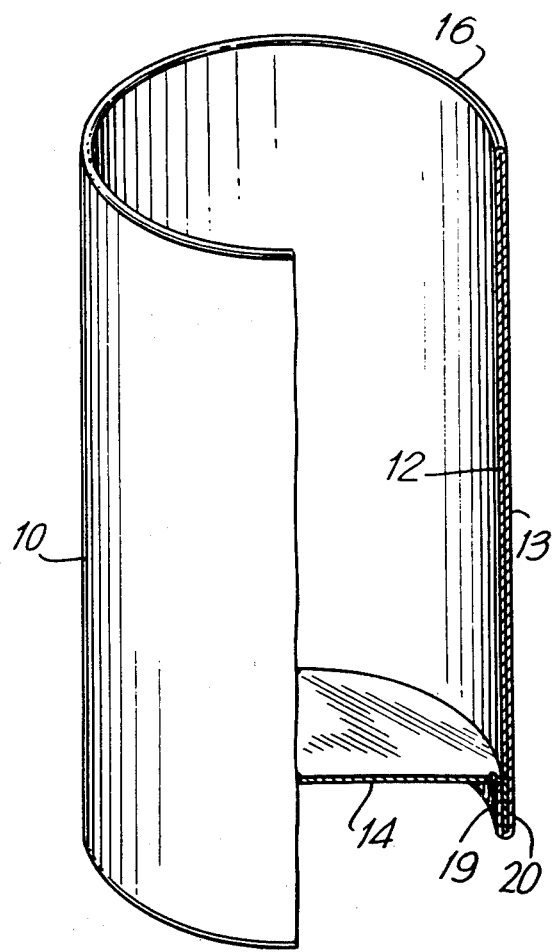
FIG. 2 shows a sectional view of the preferred paperboard outer container of the present invention.
Figure 3:
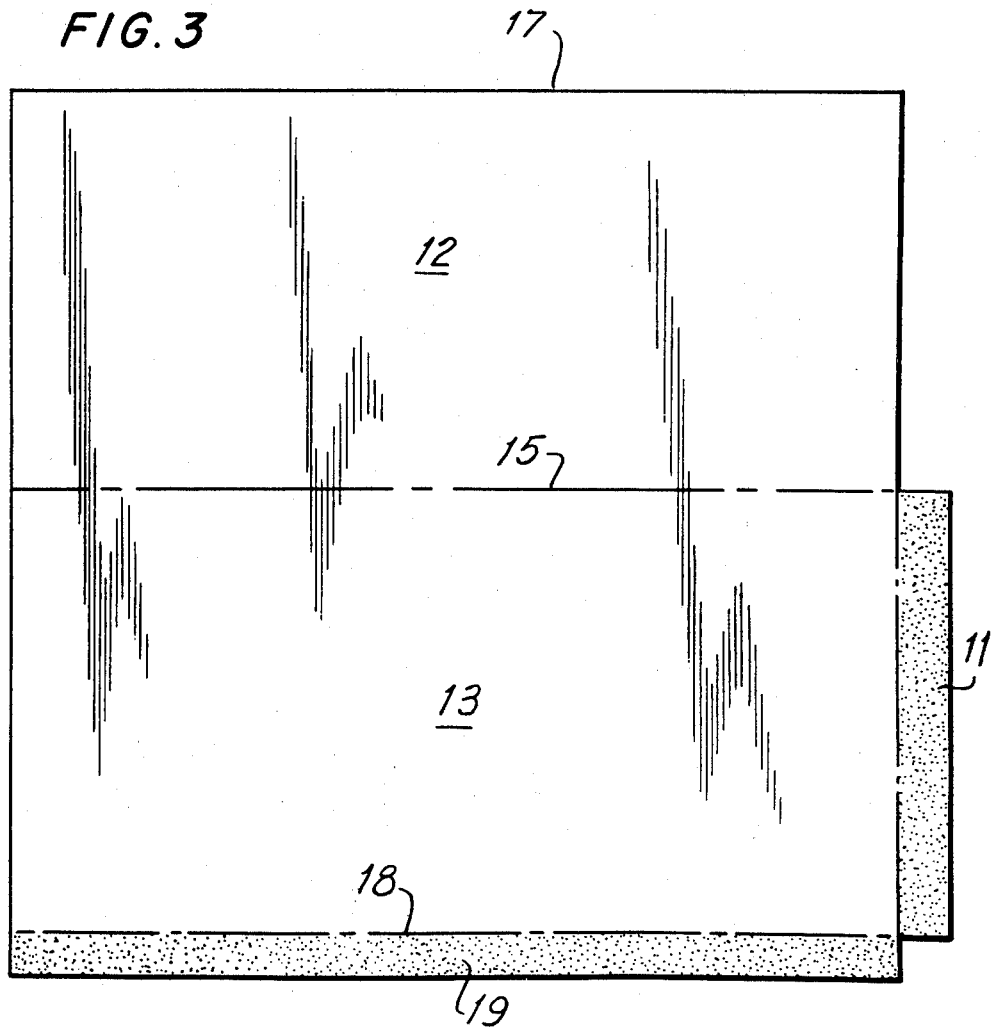
FIG. 3 is a plan view of the blank used to form the vertical wall section of the paperboard outer container shown in FIG. 2.
Figure 4:
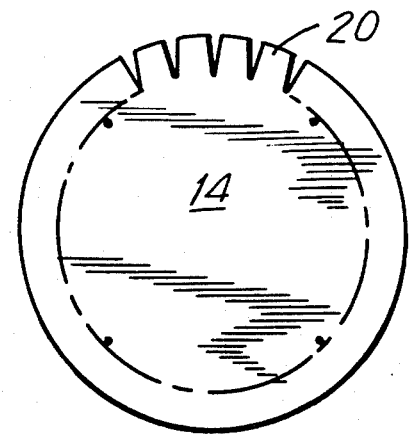
FIG. 4 is a plan view of the blank used to form the bottom of the paperboard outer container shown in FIG. 2.

The construction of the paperboard outer container used in the preferred embodiment of the present invention is best seen from FIGS. 2–4. As shown in FIG. 2, paperboard inner container 10 comprises an inside vertical wall 12, an outside vertical wall 13 and a false bottom 14. The paperboard outer container used in a preferred embodiment of the present invention is constructed from the blanks shown in FIGS. 3 and 4. The blank shown in FIG. 3 is provided with adhesive (represented by dots), preferably applied just prior to the construction of the paperboard outer container, in a portion of the outside vertical panel wall 13 and in the panel 19 which extends from the outside vertical wall panel 13 along score line 18. To construct the paperboard outer container, the blank shown in FIG. 3 is folded along score line 15 thereby forming the edge which serves as the upper edge 16 of the constructed container. When the blank is thus folded, edge 17 of the blank shown in FIG. 3 is spaced about the width of panel 19 from score line 18. Thereafter, the container may be constructed by: (a) further folding the blank so that the adhesive coated portion of outside vertical wall panel 13 extends about the opposite side of the outside vertical wall panel; (b) inserting blank 14 into the bottom portion of the blank folded as in (a) so that tabs 20 extend downwardly from panel 14 parallel to outside vertical wall panel 13; and (c) folding panel 19 so that tabs 20 are sandwiched between panel 19 and outside vertical wall 13 as shown in FIG. 2. During the construction of the container, pressure is applied at the appropriate locations to obtain adhesive bonds so as to maintain the container in its erected position.

It should be understood that the paperboard outer container described above is only a preferred outer container and that other paperboard outer containers are contemplated to be within the scope of the present invention. For example, paperboard outer containers with no bottom may be used in the present invention. And, containers with single vertical walls rather than double vertical walls may be used in the present invention when the strength of a double wall construction is not desired. Moreover, rather than forming tabs 20 by making a V-cut in a blank as illustrated in FIG. 4, those tabs may be formed by short radial cuts in the blank.

The container of the present invention also comprises a plastic inner container 21 which, as described more fully below, has been drawn and blow formed into the paperboard outer container. The containers of the present invention further comprise plastic screw threads 22 around the upper portion of the paperboard outer container. As is apparent from FIG. 1, plastic screw threads 22 are formed from plastic which extends from the plastic inner container around the top edge 16 of the paperboard outer container. As will be described in more detail below, the plastic which extends around the top edge 16 of the paperboard outer container preferably is bonded to the paperboard during the construction of the container.

The plastic inner container 21 is preferably spaced from the edge of the paperboard outer container defined by the intersection of vertical inner wall 12 and bottom 14. As in the '834 application, the reason for this is that the strength of the containers of the present invention is substantially enhanced by spacing the plastic inner container from the edge of the paperboard outer container formed by inside vertical wall 12 and bottom 14. Specifically, the plastic inner container preferably should be spaced from about ⅛ inch to about ⅜ inch, and most preferably about ¼ inch, from the edge formed by the intersection of inside vertical wall 12 and bottom 14.

The plastic which is used to form the plastic inner container and screw threads of the present invention may be chosen from a plurality of different materials, e.g. the same materials which may be used to form the plastic inner container disclosed in the '834 application.

Referring now to FIG. 1, the container of the present invention also may include a sealable cover 23. Sealable cover 23 may be constructed from a plurality of different materials, e.g. polyethylene or wax coated paper or laminations of paper, plastic and aluminum foil, e.g. paper-plastic-foil-plastic laminations. The sealable cover may be applied to the plastic on the upper edge 16 of paperboard outer container by any well known method in the art, e.g. by ultrasonic sound waves, heat, glue or electronic impulse. The necessity of a sealable cover is dependent on the product stored in the container. If the product is not perishable or only slowly perishable, such a cover may not be necessary.

Referring again to FIG. 1, the container of the present invention also comprise a screw-on cap 24. Such caps are well known in the container art and may include the sealable cover or a foam, e.g. polypropylene or polyurethane foam, liner which performs substantially the same sealing function as the sealable cover. Preferably, the cap includes the sealable cover in close abutment with the inside surface of the top of the cap. Such a cover may be heat sealed to the container by the application of heat through the cap after the cap is screwed onto the container.

Figure 5:
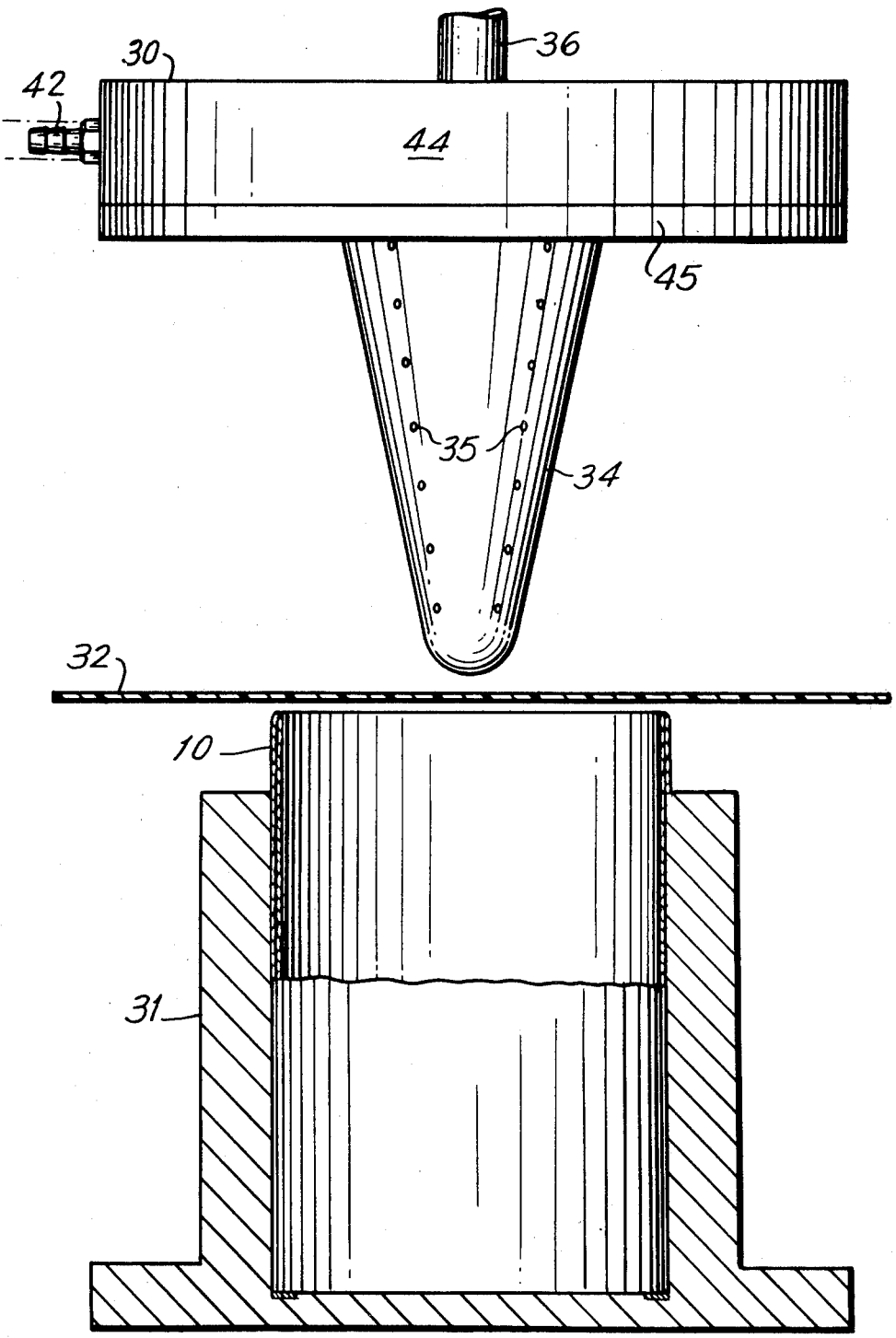
FIG. 5 shows a view of the arrangement of the male mandrel, female mold, plastic sheet and paperboard outer container before plastic is drawn into the paperboard outer container.
Figure 6:
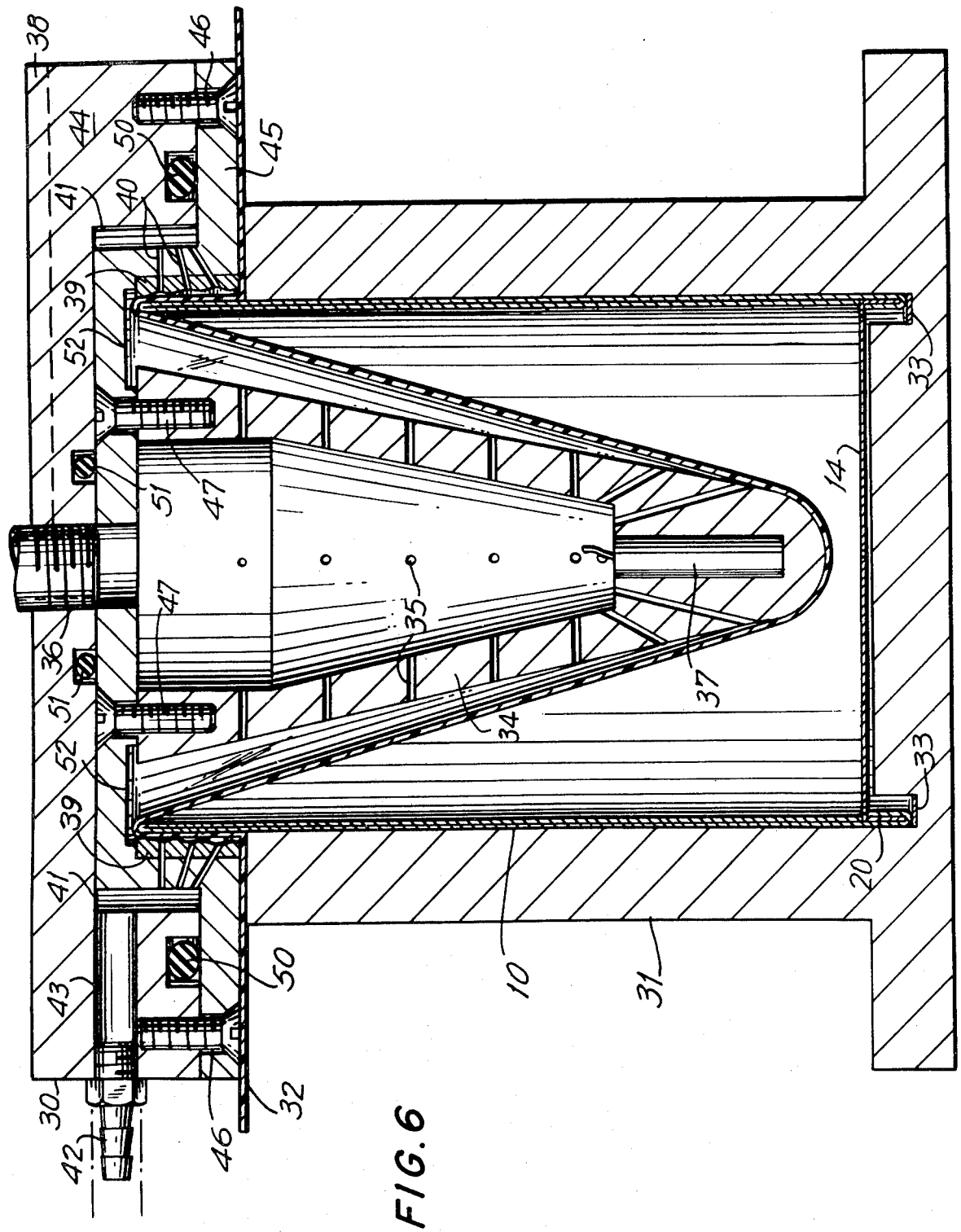
FIG. 6 shows a sectional view of the arrangement of the male mandrel, female mold, plastic sheet and paperboard container simultaneously with the plastic being fully drawn into the paperboard outer container, but before the plastic is blow formed into the paperboard outer container and before the plastic is vacuum formed into screw threads.
Figure 7:
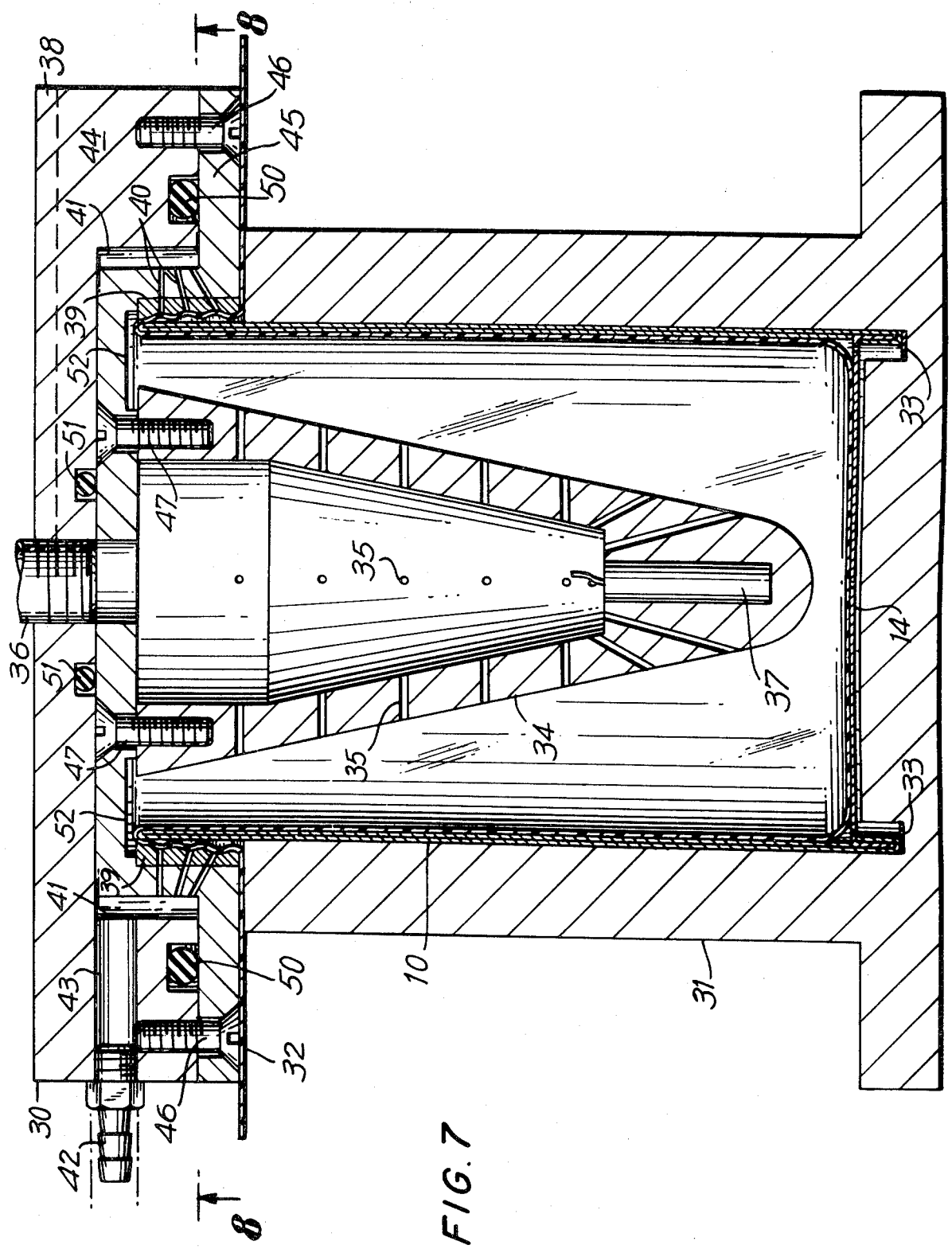
FIG. 7 shows a sectional view of the arrangement of the male mandrel, female mold, plastic sheet and paperboard container after the plastic is blow formed into a plastic inner container and vacuum formed into screw threads.

Referring now to FIGS. 5–7, there is shown stepwise the process for drawing and blow forming inner container 21 into paperboard outer container 10 and for vacuum forming screw threads 22 about the upper portion of paperboard outer container 10. Specifically referring to FIG. 5, there is shown a view of the arrangement of male mandrel 30, female mold 31, plastic sheet 32, and paperboard outer container 10 prior to drawing plastic sheet 32 into paperboard outer container 10. The upper portion of the paperboard outer container 10 extends upwardly beyond the upper portion of the female mold 31. As will be explained more fully hereinafter, plastic screw threads are subsequently vacuum formed about that upper portion of paperboard outer container 10.

As shown in FIG. 5, initially the paperboard outer container is placed in the female mold 31 and plastic sheet 32 is positioned between male mandrel 30 and female mold 31. As can be seen from FIGS. 6 and 7, in the preferred embodiment female mold 31 is especially designed at its bottom to receive a container with a raised false bottom 14. Additionally, the bottom of the female mold is preferably provided with a pad 33, e.g. a silicone rubber pad, to cushion the paperboard outer container 10 when it is positioned in the female mold 31.

As can also be seen from FIGS. 5–7, male mandrel 30 comprises a drawing and blow forming member 34 which is arranged and constructed with respect to the female mold so that the plastic sheet may be drawn into the female mold 31 by that member 34. Preferably, the drawing and blow forming member 34 is conical as shown in FIG. 5. The drawing and blow forming member 34 has a plurality of holes which are in communication via gas channel 36 with a source of gas under pressure (not shown). Additionally, drawing and blow forming member 34 preferably also includes heating means 37 to maintain the temperature of the plastic during later described drawing and blow forming steps. The heating means is in communication with a source of power (not shown) via heater wire channel 38.

Male mandrel further comprises a screw thread forming means 39 which is arranged and constructed on the male mandrel so that when male mandrel 30 is fully engaged with female mold 31, as shown in FIG. 6, the inner edges of screw thread forming means 39 are in close proximity with a plastic sheet 32 which has been drawn in close abutment about the upper portion of outer container 10. The screw thread forming means 39 shown in FIGS. 6–7 is in the form of a sleeve which was pre-formed separately from the rest of the male mandrel. However, it is to be understood that such pre-formed screw thread forming means formed separately from the rest of the male mandrel are only preferred and are not essential to the present invention. As shown in FIGS. 6–7, screw thread forming means 39 is provided with channels 40 in communication with vacuum chamber 41, which is in turn in communication with a source of vacuum (not shown) via channel 43 and vacuum hookup 42.

As shown in FIGS. 6–7, vacuum chamber 41 is positioned between first mandrel headpiece 44 and second mandrel headpiece 45. First mandrel headpiece 44 and second mandrel headpiece 45 are joined together by screws 46 and drawing and blow forming member 34 is joined to second mandrel headpiece 45 by screws 47.

Figure 8:
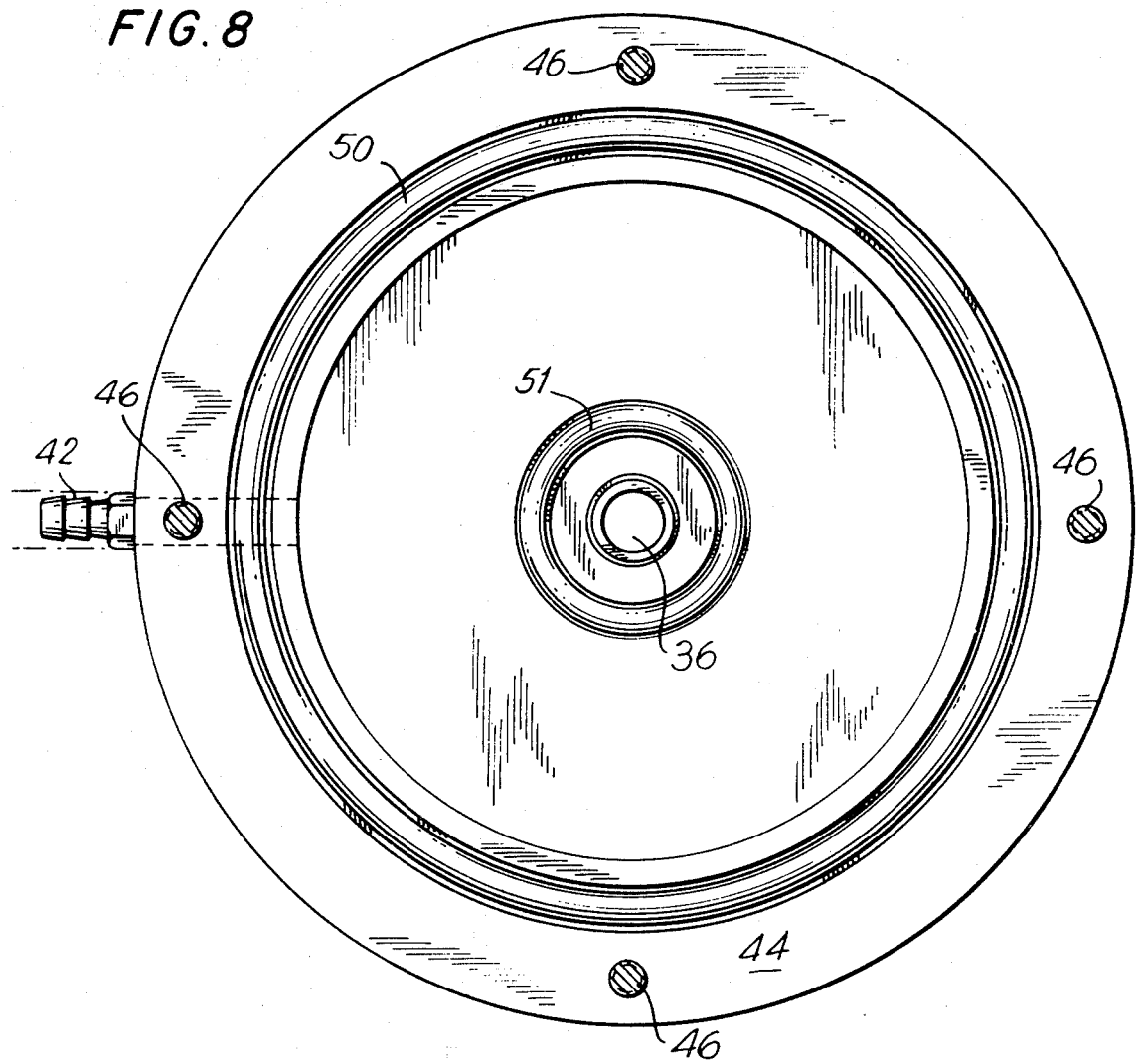
FIG. 8 is a cross-sectional view of the bottom surface of element 44 of male mandrel along planes defined by the lower surface of element 44 in FIGS. 6 and 7.

Male mandrel 30 is also provided with means for maintaining the vacuum created in vacuum chamber 41, channels 40, and the space between screw thread forming means 39 and plastic 32. As shown in FIGS. 6–8, those means comprises O-ring 50, O-ring 51, and silicone rubber gasket 52. O-ring 51 and silicone rubber gasket 52 also serve the function of helping to maintain pressure within the interior of the female mold during a later described blow forming step.

Prior to positioning plastic sheet 32 as shown in FIG. 5 and described above, that plastic sheet is pre-heated to a thermal formable temperature, i.e. a temperature to permit drawing, blow forming and vacuum forming the plastic sheet 32 in the manner which will be described below. Preferably, the plastic is pre-heated by radiant heating (not shown). Additionally, depending on many factors which will be appreciated by those skilled in the art, e.g. the plastic used, the ambient temperature the temperature that the plastic is pre-heated to, residence times, etc., it may be necessary or desirable to heat the male mandrel by heating means 37.

As in the '834 application, the thickness of undrawn plastic sheet 32 may be varied widely depending on the size of the container and the plastic used.

Referring now to FIG. 6, there is shown in cross-section the arrangement of male mandrel 30, female mold 31, plastic sheet 32 and paperboard outer container 10 simultaneously with the plastic sheet 32 being fully drawn into the paperboard outer container, but before the plastic is blow formed into the paperboard outer container and before plastic is vacuum formed into screw threads.

As will be appreciated upon reference to FIG. 6, male mandrel 30, female mole 31, plastic sheet 32 and paperboard outer container 10 are arranged and constructed so that when the drawing operation is completed: (a) second mandrel headpiece 45 is in close abutment with and pressed against a portion of plastic sheet 32 which is in close abutment with and pressed against the upper horizontal wall of female mole 31; (b) a portion of plastic sheet 32 extends vertically and in close abutment around the upper portion of paperboard outer container 10 which extends above female mold 31; and (c) silicone rubber gasket 52 is in close abutment and pressing against the upper portion of plastic sheet 32 to form a seal between said gasket and said plastic sheet.

With the male mandrel, female mold, plastic sheet, and paperboard container positioned as shown in FIG. 6, and preferably substantially concurrently with the completion of the drawing step, blow forming of the plastic inner container and vacuum forming of the screw threads is commenced. It is preferred that the steps of blow forming and vacuum forming commence substantially concurrently with the completion of the drawing step because by doing this: (a) the tendency of the plastic sheet 32 to stick to paperboard outer container 10 and thereby inhibit vacuum forming of screw threads 22 is minimized; and (b) cooling of the plastic before completion of blow forming and vacuum forming is minimized; such cooling can cause the plastic to set or harden thereby inhibiting or preventing blow forming and vacuum forming.

Blow forming is accomplished by directing gas, preferably air, under pressure out of air holes 35 provided in male mandrel 30 substantially as described in the '834 application. Slots, cuts or pin holes (not shown) are provided in the bottom of paperboard outer container to relieve pressure in that container during blow forming and suitable means (not shown) are also provided in female mold 31 to relieve pressure from that mold during blow forming.

A wide range of gas pressures may be used in the blow forming step of the present invention. For example, the gas pressure at the intake to male mandrel may be between about 5 to 50 psig. We prefer, however, for reasons of safety and economics to use relatively low air pressures, i.e. less than about 25 psig.

It should be understood that it is within the scope of the present invention to use male mandrels with drawing and blow forming members which are not conical. However, it should also be understood that with certain types of containers gas should be directed from the drawing and blow forming member 34 substantially as disclosed in the '834 application, i.e. (a) if the paperboard outer container has a bottom, gas should be directed substantially toward an edge of the paperboard inner container defined by the intersection of the bottom and at least one vertical wall of the paperboard outer container; and (b) if the paperboard outer container has more than one vertical wall, gas should be directed into or toward each edge of the paperboard outer container defined by the intersection of two vertical walls of said outer container. With respect to (b) above, it should be understood that the upper portion of paperboard outer container must have a circular cross-section in order to have circular screw threads vacuum formed therearound.

The reasons for and advantages of directing gas in the manner stated above are set forth in the '834 application and will not be repeated herein.

It was stated above that a wide range of gas pressures at the gas intake of the male mandrel are contemplated. However, it is preferred that the air pressure be controlled during blow forming so that plastic inner container is spaced from the bottom edges of the paperboard outer container defined by the intersection of the bottom of the outer container and each vertical wall of that container. Specifically, as described above, the blow forming is preferably controlled so that the plastic inner container is spaced from about $\frac{1}{8}$ inch to about $\frac{3}{8}$ inch from those bottom edges of the outer container. Additionally, the gas used to blow form may be heated either by the male mandrel or by external means in order to help maintain the plastic in a thermal formable state during the blow forming step.

Vacuum forming is accomplished by applying a vacuum via channels 40 into the space between plastic sheet 32 and screw thread forming means 39. The vacuum applied may be varied widely but preferably is about 1-30 inches of mercury at the vacuum intake to male mandrel 30. As shown in FIGS. 5-7, air channels 40 preferably are arranged and constructed so that vacuum is drawn from the outermost points of the grooves of screw thread forming means 39. Air channels 40 are arranged at a plurality of locations about the entire circumference of screw thread forming means 39 and are preferably small enough so that plastic is not drawn therein during vacuum forming.

Referring now to FIG. 7, there is shown the arrangement of plastic sheet 32, male mandrel 30, female mold 31, and paperboard outer container 10 at the end of the blow forming and vacuum forming process. At this point the source of gas and vacuum may be shut off and the container may be removed from the mold. One method of removing the container is to disengage the female mold from the container and male mandrel and thereafter to unscrew the container from the male mandrel. Unscrewing the container from the male mandrel is facilitated because, as discussed above, in the preferred embodiment, plastic sheet 32 is bonded to the top edge of paperboard outer container during the construction of the container. This bonding occurs as an incident to the pressure applied to the plastic sheet 32 by silicone foam gasket 52 during the construction of the container.

It is within the scope of the present invention to remove the container from the female mold and male mandrel by other means. For example, a split female mold and split male mandrel which is opened to permit removal of the container may be used.

It will be appreciated that the portion of plastic sheet 32 extending outwardly from screw threads 22, as shown in FIG. 7, should be cut from the container. One method of doing this is by scissors or other cutting means after the container is removed from the mold. Another method of doing this is to provide cutting means in the female mold and/or male mandrel so that plastic sheet 32 is cut by shearing action either during the drawing step or shortly thereafter while the container is still in the mold. Other methods for cutting plastic sheet 32 will be appreciated by those skilled in the art and are within the scope of the present invention. When the containers of the present invention are used to store food, care should be taken to insure that no plastic cut from the containers is deposited into the interior of the container during or after the cutting action. For example, when a split mold and split male mandrel are used and the plastic is cut in the mold, the deposit of plastic in the interior of the container may be avoided by removing the container vertically upward after the mold and mandrel are opened.

Figure 9:
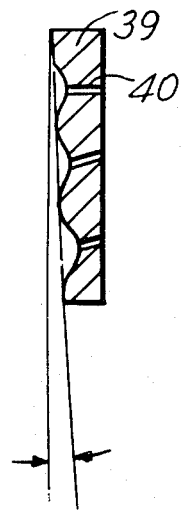
FIG. 9 is an enlarged cross-section view of one-half of the preferred screw thread forming means of male mandrel taken along a plane through the axis of the screw thread forming means. The 1° angle shown is exaggerated for the purposes of illustration.

To facilitate entry of the paperboard outer container into the male mandrel, it is preferred that screw thread forming means be arranged and constructed so that the line defined by the innermost portions of the screw thread forming means and a plane through the axis of the screw thread forming means is inclined slightly from the vertical, e,g, about ½° to 3°, preferably 1°. The preferred angle is illustrated in FIG. 9; the angle is exaggerated for purposes of illustration. Of course, a result of so designing the screw thread forming is that the line defined by the innermost portion of screw threads vacuum formed in the container and a plane through the axis of those screw threads is similarly slightly inclined from the vertical. Because the screw-on cap does not have screws which are inclined from the vertical, by inclining the screw threads as described above, a tight fit between the cap and container is facilitated, i.e. the lower portion of the plastic screw threads may be arranged and constructed so that that portion pushes tightly against the screws of the screw-on cap.

After the container is removed from the female mold and male mandrel, it may be filled with food or product. As stated above, depending on the product stored, it may be desirable to heat seal the container with food stored therein with a sealable cover. The container may also be provided with a screw-on cap.

It is to be understood that while the invention has been described with respect to a preferred embodiment, variations and equivalents thereof may be perceived by those skilled in the art. For example, it is not necessary that the drawing and blow forming member of the present invention have a heating means. Moreover, other methods and means of applying and maintaining a vacuum between the plastic sheet and screw thread forming means as shown in FIG. 6 are within the scope of the present invention.

What is claimed is:

1. An apparatus for drawing and blow forming plastic into a paperboard outer container and vacuum forming plastic screw threads about the upper portion of said outer container comprising:
   (a) a female mold, said female mold comprising at least one vertical wall and a bottom wall;
   (b) a male mandrel comprising:
      (i) a drawing and blow forming member positionable within said female mold, said drawing and blow forming member provided with holes in communication with a source of gas whereby gas may be directed from the interior of said drawing and blow forming member into the interior of said female mold, said female mold and drawing and blow forming member being arranged and constructed so that a sheet of plastic may be drawn by said drawing and blow forming member into said female mold and thereafter blow formed in said female mold;
      (ii) screw thread forming means, including an annular screw thread forming surface spaced from and surrounding the upper portion of said member so as to be positioned adjacent an end of said female mold when said member is positioned within said female mold, said screw thread forming means including means providing communication between said surface and a source of vacuum, said screw thread forming means being arranged and constructed so that plastic screw threads may be formed about the upper outside portion of a paperboard outer container positioned in said female mold so that the upper portion of the outer container extends outside the female mold, said plastic screw threads being formed from plastic extending around the upper edge of said paperboard outer container and in close proximity about the outside of said upper portion of the outer container.

2. The apparatus of claim 1 wherein said drawing and blow forming member is conical.

3. The apparatus of claim 1 wherein said screw thread forming means comprises channels in communication with a vacuum chamber in said male mandrel.

4. The apparatus of claim 3 wherein said vacuum chamber is in communication with a source of vacuum through a channel in said male mandrel.

5. The apparatus of claim 3 wherein said vacuum chamber is positioned between a first mandrel headpiece and a second mandrel headpiece in said male mandrel.

6. The apparatus of claim 3 further comprising O-ring means for maintaining vacuum in said vacuum chamber.

7. The apparatus of claim 1 wherein said male mandrel further comprises gasket means arranged and constructed so that the plastic extending around the upper edge of said paperboard outer container may be pressed against said upper edge by said gasket means.

8. The apparatus of claim 1 wherein said female mold further comprises pad means at the bottom of said female mold.

9. The apparatus of claim 1 wherein the line defined by innermost portions of screw thread forming means and a plane through the axis of said screw thread forming means is about ½° to 3° from the vertical.

10. An apparatus for drawing and blow forming plastic into a paperboard outer container and vacuum forming plastic screw threads about the upper portion of said outer container comprising:
   (a) a female mold, said female mold comprising at least one vertical wall and a bottom wall;
   (b) a male mandrel comprising:
      (i) a member positionable within said female mold for drawing and blow forming plastic into a paperboard outer container positioned in the female mold, said member for drawing and blow forming provided with holes in communication with a source of gas whereby gas may be directed from the interior of said member for drawing and blow forming into the interior of said female mold, said female mold and member for drawing and blow forming being arranged and constructed so that a sheet of plastic may be drawn by said member for drawing and blow forming into said female mold and thereafter blow formed in said female mold;

(ii) screw thread forming means, including an annular screw thread forming surface spaced form and surrounding the upper portion of said member so as to be positioned adjacent an end of said female mold when said member is positioned within said female mold, said screw thread forming means including means providing communication between said surface and a source of vacuum, said screw thread forming means being arranged and constructed so that plastic screw threads may be formed about the upper outside portion of a paperboard outer container positioned in said female mold so that the upper outside portion of the outer container extends outside the female mold, said plastic screw threads being formed from plastic extending around the upper edge of said paperboard outer container and in close proximity about the outside of said upper portion of the outer container.

11. The apparatus of claim 10 wherein said screw thread forming means comprises channels in communication with a vacuum chamber in said male mandrel.

12. The apparatus of claim 11 wherein said vacuum chamber is in communication with a source of vacuum through a channel in said male mandrel.

13. The apparatus of claim 11 wherein said vacuum chamber is positioned between a first mandrel headpiece and a second mandrel headpiece in said male mandrel.

14. The apparatus of claim 10 wherein the line defined by innermost portions of screw thread forming means and a plane through the axis of said screw thread forming means is about $\frac{1}{2}°$ to 3° from the vertical.

* * * * *

UNITED STATES PATENT AND TRADEMARK OFFICE
CERTIFICATE OF CORRECTION

PATENT NO. : 4,382,767
DATED : May 10, 1983
INVENTOR(S) : George H. Naugle, et al.

It is certified that error appears in the above—identified patent and that said Letters Patent is hereby corrected as shown below:

Col. 7, line 13, "mole" should be --mold--.

Col. 11, line 2, "form" should be --from--.

Signed and Sealed this

Nineteenth Day of July 1983

[SEAL]

Attest:

Attesting Officer

GERALD J. MOSSINGHOFF
Commissioner of Patents and Trademarks